Fig. 1.

Patented Oct. 7, 1952

2,613,350

UNITED STATES PATENT OFFICE 2,613,350

FLIGHT INDICATING SYSTEM FOR DIRIGIBLE CRAFT

Spencer Kellogg, 2nd, Glen Head, N. Y., assignor to The Sperry Corporation, Great Neck, N. Y., a corporation of Delaware Application March 16, 1948, Serial No. 15,064

34 Claims. (Cl. 343—107)

This invention relates to a navigating or flying aid system for dirigible craft in which a variety of information is coordinated and preferably presented on the respective pointers of a cross pointer meter or other indicator. The sources of this coordinated information are a vertical reference such as a vertical gyro, an altitude reference such as an altimeter, an azimuth reference such as a directional gyro or magnetic compass, a directional radio beam receiver and instrument landing localizer and glide path receivers.

The system can be used, in enabling the navigation of a dirigible craft, such as an aircraft, employing the same, in cross country flight, in flying on a directional radio beam and for instrument landing. In all of these instances, it is only necessary for the pilot to control the craft according to the indications of the meter in order to properly approach and maintain the craft in a desired flight path or predetermined direction of motion. When the system is used in cross country flight, the vertical pointer of the indicating meter is controlled by a signal from the azimuth reference and by a roll signal from the vertical reference. The horizontal pointer of the meter is controlled by a pitch signal from the vertical reference and a signal from the altitude reference. When the craft is to fly a directional radio beam path a signal from the radio receiver is added to the noted signals for controlling the vertical pointer of the indicating meter. When the system is used in controlling the craft in instrument landing, a signal from the localizer receiver is combined with the noted roll and azimuth signals to control the vertical pointer of the cross pointer meter and a signal from the glide path receiver is combined with a pitch signal from the vertical reference to control the horizontal pointer of the cross pointer meter.

The primary object of the present invention is to combine navigational information of the character noted and present the results of the same on one indicating instrument containing only two pointers for observation by the pilot. By simplification of the indicating instrument, the invention is particularly useful in instrument landing systems as employed on aircraft.

It is well known that a conventional instrument landing approach imposes a difficult problem and requires extreme precision on the part of the pilot. With considerable practice the pilot can become proficient in the use of present beam landing systems, but the probability of missing on approach is still great. The difficulty is caused by the precise path along which the craft must be flown. In order to follow this path, the pilot is required to give considerable attention to a cross pointer meter in addition to other standard flight instruments. As the airplane approaches the airport, the landing beam continually grows narrower until its dimensions are about ±75 feet laterally and ±10 feet vertically at the end of the runway. It can be well appreciated that it is difficult to maintain a path within this narrow area especially when the guiding instrument or cross pointer meter, as heretofore used, only indicates the amount and direction of the craft's displacement from the line of position defined by the landing beam. Furthermore, the correction required for a given indication of displacement does not remain constant, but varies in proportion to beam width.

The Sperry Flightray system, as shown in Moseley et al. Patent No. 2,262,245, issued November 11, 1941, presented information in a single indicating device of instruments of the following character: a directional gyro, gyro horizon, airspeed indicator, turn and bank indicator, glide path receiver, localizer receiver and altimeter. This information, however, was presented as a number of more or less unrelated indications on a single instrument face and all the information had to be viewed and interpreted separately by the pilot. Only by correctly interpreting all of the information was the pilot able to apply the proper control to the aircraft. It was necessary for the pilot to combine all the observed information mentally, to arrive at a conclusion as to what should be done and then do it. In accordance with the present invention, the information noted is combined and presented to the pilot so that he has only to steer the craft to maintain the pointers of the indicator at the null or zero position. The indicator or meter shows the pilot the sense and amount of steering control needed to bring the craft asymptotically to and maintain the craft on a predetermined flight path without over-shooting. As the system combines the information for the pilot prior to its presentation on the indicator, the pilot is relieved of the necessity of combining the information mentally.

In following the indications of a cross pointer meter in the present system as a basic flight instrument in cross country flight and as a navigation instrument for flying a directional radio beam, the pilot is provided with an opportunity to obtain practice and familiarity with the cross pointer meter indicating instrument which the pilot uses in making instrument landings. It will be understood that at present, the cross pointer meter is used only during instrument landings in which the same indicates the position of the craft relative to a landing path defined by a radio beam.

One of the features of the invention resides in the employment of a roll or bank signal as one of the operating signals for the indicating meter of the improved system.

Another feature of the invention resides in the employment of an altitude control signal as another of the operating signals for the indicating meter of the improved system.

Other features and structural details of the invention will be apparent from the following description when read in relation to the accompanying drawings, wherein.

Figure 1:
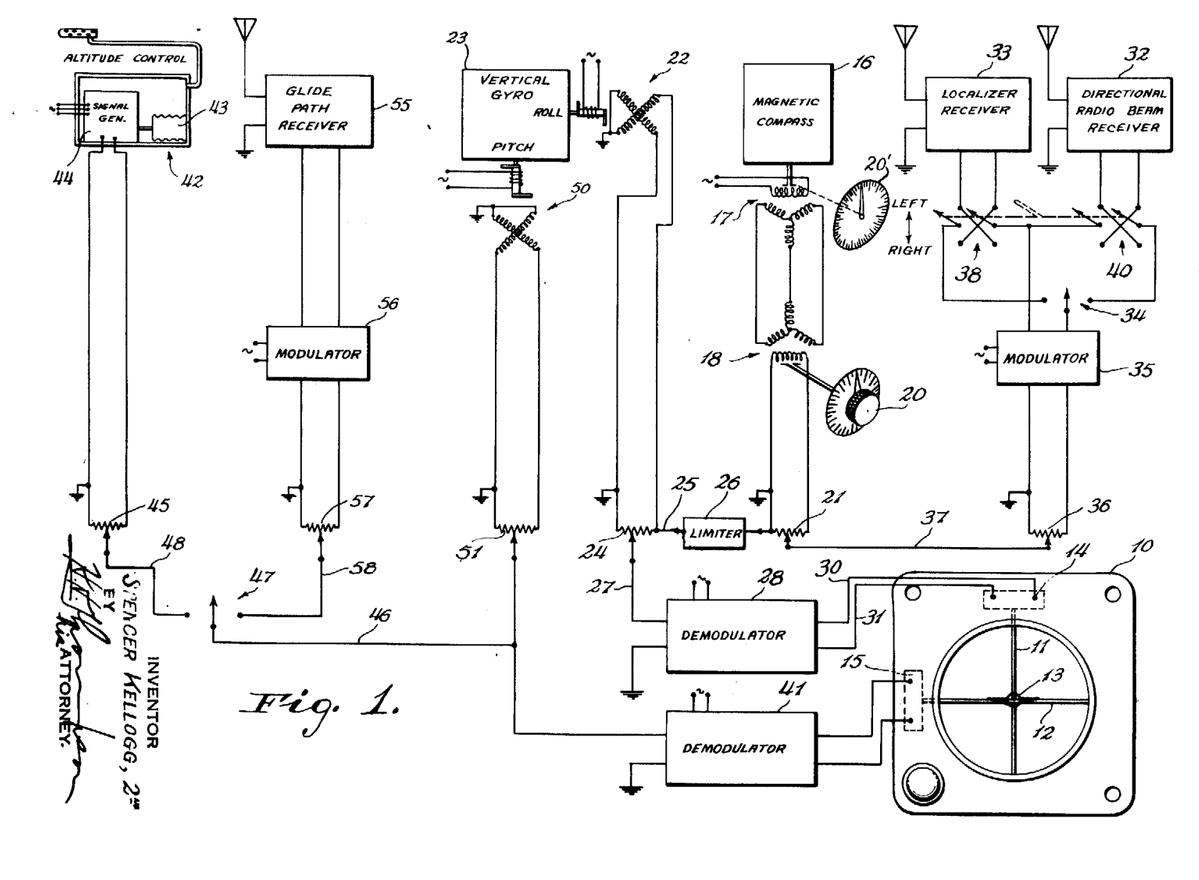
Fig. 1 is a schematic view and wiring diagram showing a system embodying the present inventive concepts.

As shown in Fig. 1, the improved navigating aid system includes an indicating meter 10 of the cross pointer type having a vertical pointer 11 and a horizontal pointer 12. Pointer 11 is movable to the right and left of a reference position 13 provided on the face of the meter by means of a suitable moving-coil galvanometer driving unit indicated at 14. In accordance with the improved system, the pilot flies the craft for the course guidance with pointer 11 at the reference position 13 of the meter 10. Pointer 12 is movable above and below the reference position 13 by means of a driving unit similar to unit 14 indicated at 15. The pilot also flies the craft for pitch guidance with pointer 12 at the reference position 13 of the meter. Units 14 and 15 are of conventional construction and provide a means for moving the respective pointers 11 and 12 of the indicating meter. It will be understood that the zero position of pointers 11 and 12 is at position 13 of the meter. Pointer 11 is only moved from this position by unit 14 when the craft departs initially from a reference course and pointer 12 is only moved from this position by unit 15 when the craft departs initially from a reference position about its pitch axis. The word "pointer" as herein employed is a generic term for an observable member that is movable in the manner described relative to a reference position.

The directional or azimuth reference of the improved system may be provided by a magnetic compass of the character shown and described in the U. S. Patent No. 2,357,319 of September 5, 1944 to O. E. Esval et al. As herein shown, this reference is indicated at 16. The directional reference 16 is shown as positioning the rotor of a selsyn repeater system whose transmitter is indicated at 17 and whose receiver is indicated at 18. The rotor of transmitter 17 is energized from a suitable source of alternating current electrical energy. The rotor of the receiver 18 is positioned manually by a knob or selector 20 in accordance with the desired heading of the craft. The output of receiver 18 is fed to a potentiometer 21 and the signal at this point is zero as long as the craft is flying on the desired course or heading set on knob 20. When the craft departs from this course, a signal appears on the potentiometer 21 whose phase depends on the direction of the departure and whose amplitude depends on the extent of the deviation. This signal is fed to unit 14 of the meter 10 as hereinafter more fully described to control the movement of vertical pointer 11. The reference 16 and repeater system provides a signal means for providing an output in accordance with changes of the craft from a predetermined heading.

In accordance with the present invention, a roll or bank signal is provided as one of the operating signals for the vertical pointer 11 of the cross pointer meter 10. As shown, this signal is derived from a telegon transmitter 22 at the roll axis of a vertical reference such as a gyro vertical indicated at 23. The single phase winding of the transmitter 22 is energized from a suitable source of alternating current electrical energy and the device produces a null output when the craft is not banked. The phase of the output signal depends on the direction that the craft banks in from a zero bank condition about its fore and aft axes and the amplitude of the signal depends on the extent of the banking angle. This signal means provides an output in accordance with the angle of bank of the craft. The signal of transmitter 22 is impressed across a second potentiometer 24 in series with potentiometer 21 by way of lead 25. Lead 25 also includes a voltage limiter 26 of conventional construction for limiting the input signal to unit 14 from potentiometer 21. A lead 27 connects the set arm of potentiometer 24 to a suitable demodulator indicated at 28, which converts the alternating current signal in lead 27 to a direct current signal that is fed to the unit 14 by way of leads 30, 31. The heading and bank signal means are additively or subtractively combined by the respective potentiometers 21 and 24 and the lead 25 and the same are operatively connected to the pointer moving means unit 14 through lead 27, demodulator 28 and leads 30 and 31. By flying the craft with pointer 11 centralized or at its reference position 13, the pilot is able to maintain a straight course free of bank. The course is that set by knob 20 and the use of the system would be in cross country flight. If the craft departed from course, due to air turbulence or other cause, a signal appears across potentiometer 21 that moves pointer 11 to the right or left of the position 13 depending on the direction of the deviation. If, for example, the pointer moves to the left of position 13, the pilot banks the craft to turn left, a signal then appearing on potentiometer 24 in a sense to balance the input signal to unit 14 from the potentiometer 21. As the craft approaches the correct heading, the signal from potentiometer 21 diminishes. The pilot also reduces the bank angle of the craft so that the pointer 11 does not move to the right of the position 13 of the meter and the craft returns to the proper heading with zero input to the meter from both its signal sources.

Figure 2:
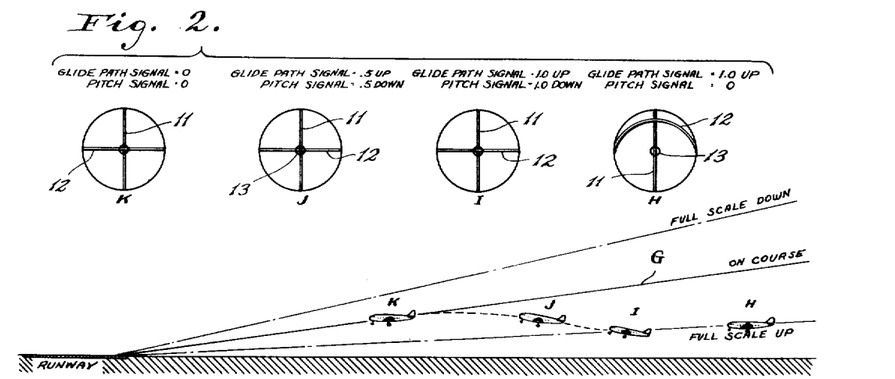
Fig. 2 is a diagrammatic view used in the description of the operation of the system in flying the aircraft along a glide path.
Figure 3:
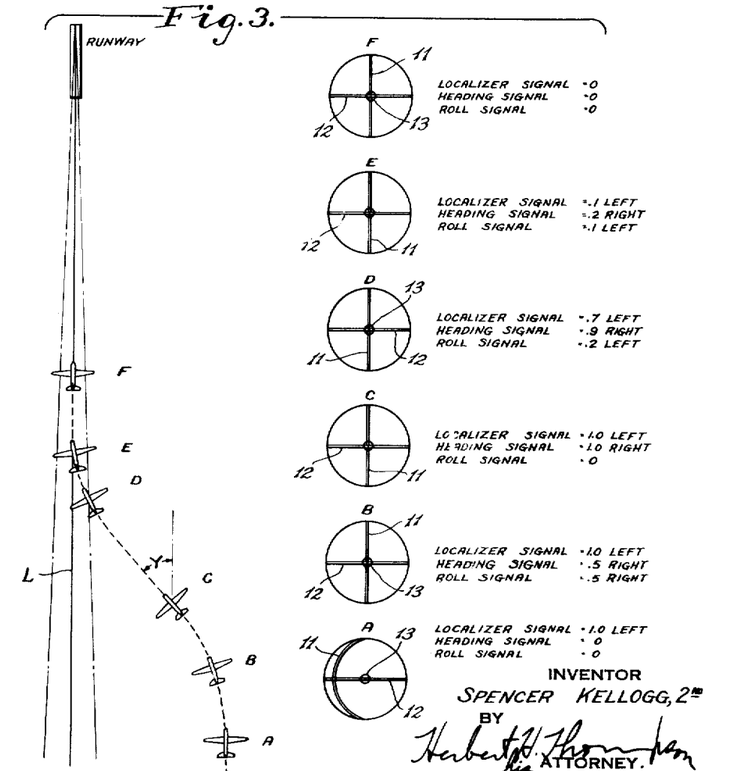
Fig. 3 is a view similar to Fig. 2 used in the description of the operation of the system in flying the aircraft along a localizer path.

The improved system is also adapted for use in guiding the craft on a directional radio path and on a radio beam localizer path such as employed in instrument landing. In this connection, a conventional directional radio beam receiver is indicated at 32 in Fig. 1. A localizer receiver is indicated at 33. The receiver 33 is of a conventional type such as used in connection with a transmitter (not shown) of electromagnetic energy of the character described in U. S. Letters Patent No. 2,502,721, issued April 4, 1950 to P. Halpert for Instrument Landing Indicators and assigned to the assignee of the present application. In such a system, a directional or localizer path such as indicated at L in Fig. 3 is provided and a glide path such as indicated at G in Fig. 2 is provided. A three position switch 34 indicated in the off position in Fig. 1 is settable so that the direct current input from either receiver 33 or receiver 32 may be fed to a modulator 35 to convert the same to alternating current energy for mixing with the signals of the heading and bank signal means heretofore described. As shown, the output of modulator 35 is applied across a potentiometer 36 that is connected to potentiometer 21 by way of lead 37. The input circuit to the modulator 35 includes a pair of double-pole double-throw switches as indicated at 38 and 40. The switches 38 and 40 are provided to correct the output of the receivers 33 and 32 so that the polarity of the signals of the modulator 35 is proper for the direction of flight of the craft. The receivers 33 and 32 provide a signal means providing an output in accordance with the lateral distance of the craft from the radio beam localizer or directional radio path L. It will be understood that when the craft is on the path, the signal at potentiometer 36 is null. The signal at the potentiometer 36 varies in amplitude with the extent of the departure of the craft from path L. The polarity of the signal also depends on the direction of the deviation of the craft from path L.

In the system, signal means are also included for providing an output in accordance with the angle of pitch of the craft. As herein shown, such means includes the gyro vertical 23 and a pitch transmitter 50. The input to the transmitter 50 is provided by a suitable alternating current source of electrical energy. The output of transmitter 50 is fed to a potentiometer 51 and thence to unit 15 by way of a demodulator 41. With zero pitch, the output of the transmitter 50 is zero. With departure from this condition, the phase of the signal at potentiometer 51 depends on the direction of the deviation and the amplitude of the signal depends on the extent of the deviation. Any output from potentiometer 51 results in movement of pointer 12 either above or below the reference position 13. If pointer 12 goes above the position 13, the pilot operates the elevators of the craft to change the pitch attitude of the craft until the output of transmitter 50 is zero at which time pointer 12 returns to its central position.

In accordance with the present invention, when the system is used in cross country flight, pointer 12 is also controlled from a signal means that provides an output in accordance with departure in the altitude of the craft from a reference altitude. In this connection, the altitude control device indicated at 42 may be a controller of the character shown and described in U. S. Letters Patent No. 2,446,546, issued August 10, 1948 to Alexander W. Meston and assigned to the assignee of the present application. As shown, this device comprises a pressure responsive bellows 43 whose shaft positions the moving element or armature of a signal generator indicated at 44. The generator 44 may be of the E-pick-off type as specifically shown in the hereinbefore noted patent. When the craft is at the desired altitude, the transmitter 44 produces a null alternating current output. If the craft deviates from the desired altitude, the generator produces an output whose phase depends on the direction of the deviation and whose amplitude depends on the extent of the deviation. The signal from generator 44 may be applied across potentiometer 45 which is connected to potentiometer 51 by way of lead 46, three-way switch 47, which is shown in the off position in Fig. 1, and lead 48. With switch 47 closed to the left position as viewed in Fig. 1, the signals of the generators 44 and 50 are additively or subtractively combined to position pointer 12 and enable the pilot to fly the craft at a constant altitude with no pitch about the pitch axis of the craft. In flying cross country, the cross pointer indicating meter 10 is supplied with information from the altitude control device 42, the vertical reference 23 and the azimuth reference 16. In this condition, switch 34 is in its off position and switch 47 is in the left position as viewed in Fig. 1.

The system also includes a glide path radio receiver 55 that provides a direct current signal whose polarity depends on the direction that the craft deviates from path G, Fig. 2, and whose amplitude depends on the extent of the deviation. The signal from receiver 55 is changed to alternating current by a suitable modulator 56 whose output is supplied to potentiometer 57 connected by way of lead 58 to the right hand terminal of switch 47. With the system operating to guide the pilot during instrument or blind landing of the craft, the switch 47 is located in the right position so that the series-connected potentiometers 57 and 51 control the operation of pointer 12. Switch 34 is located in the left position in this instance. In the example selected for illustration of Fig. 3, the switches 38 and 40 are properly closed.

In operation of the system in an instrument or blind landing approach to an airport, reference is particularly made to Figs. 2 and 3 of the drawing. It will be understood that in this condition, receivers 33 and 55 are included in the system. For clarity in explaining the performance of the system in guiding the pilot to navigate the craft, the localizer path L approach and the glide path G approach will be considered separately. Actually, the pilot conducts both maneuvers simultaneously from his observation of the respective pointers 12 and 11 at the meter 10.

In Fig. 2, a radio beam providing a glide path G is shown extending from the airport. The craft in position H is at the bottom edge of the glide path beam and the receiver 55 provides a full scale fly-up signal as shown in the correspondingly lettered view H on the meter 10. The pointer 12 in other words is raised above the reference position 13 and the pilot provides up elevator for the craft to maneuver the same to the path G. At I, the craft is nosed up in accordance with this maneuver. However, when the craft attains a certain pitch angle, a signal is developed from the pitch transmitter 50 which cancels the signal from receiver 55 as far as the pointer 12 is concerned and the pointer 12 returns to position 13 as shown at meter location I in Fig. 2 of the drawing. This puts the craft in an attitude which will cause it to climb to the glide path G. As the craft approaches the path G, as indicated at position J for both meter and craft, the condition develops where one-half scale fly-up signal from the glide path receiver 55 is present and therefore, the nose-up attitude of the craft has been reduced by the pilot in order to maintain the pointer 12 at reference position 13 in which it is shown. From the above, it will be understood that the craft is maneuvered to the glide path G smoothly without overshooting the same if the pointer is not permitted to go below the reference position 13. At position K for both craft and meter, the craft is shown on the glide path G. At this point, the pointer 12 is centralized and there is zero input to the moving unit 15 from both transmitters 50 and 55. If a gust disturbs the pitch attitude of the craft, it is indicated immediately by movement of the pointer 12. The craft can then be returned to the proper attitude by the pilot through operation of elevators before it climbs away from or descends from the glide path G. From the above, it will be understood that the pilot guides the craft down the path G by operation of the elevators to maintain the pointer 12 at the centralized or reference position 13 on the meter.

The performance of the system on the localizer path L is shown in Fig. 3. The pilot sets knob 20, in this instance, to the heading of the localizer path L. At A, the pointer 11 of the meter 10 receives a full scale fly left signal from the localizer receiver 33 as shown in the corresponding lettered positional view of the meter. The craft at this point is headed on a course corresponding to the heading of the path L. The pilot then banks the craft to turn left and obtains a roll signal from transmitter 22 and a turn signal from compass 16 which is proportional to the angle through which the craft turns. The angle of bank set in by the pilot determines the rate of turn of the craft. At position B for both craft and meter in Fig. 3, the signal of the localizer receiver 33 to pointer 11 is balanced by the sum of the signals from transmitters 17 and 22 and the pointer 11 returns to the reference position 13. At position C of the craft, the signal from generator 17 balances that of the receiver 33 and the craft flies straight on a heading displaced from the heading of the path L by an angle Y to intercept the linear portion of the radio localizer beam. This maneuver is obtained by the pilot operating the ailerons of the craft to maintain the pointer 11 at its centralized position 13. At position D in Fig. 3, the signal from the receiver 33 begins to diminish and in order to maintain the pointer 11 central, the pilot banks the craft to turn right. This diminishes the signal from transmitter 17 and the craft approaches position F where it is on the path L, on the correct heading and with zero bank at position F. The craft follows a course approaching the beam in a damped manner in which there is no overshoot if the pointer 11 is maintained central. With the craft on the path L, the pilot banks his craft on the occurrence of a right or left indication from pointer 11 for any departure in a correct sense to restore the pointer to its central position and thus bring the craft back to the path. With the system including radio receiver 32 or 33, the provided signal is a measure of the lateral displacement of the craft from the path L. The magnitude of the approach angle toward the localizer course or path L, as obtained from transmitter-receiver 17—18 is a measure of the rate at which the displacement error of the craft relative to path L is decreasing. The signal from transmitter-receiver 17—18 thus provides a measure of the first derivative of the displacement error signal. The bank angle of the craft is a measure of the rate of yaw or rate of change of compass heading and hence provides a measure of the second derivative of the displacement error of the craft from path L. This measurement is obtained from the roll axis transmitter 22 of the system.

With the craft flying a cross country course, the signal from transmitter-receiver 17—18 provides a measure of the heading error of the craft from the desired predetermined heading. At such time, the banking angle signal of transmitter 22 provides a measurement of the rate of change of the heading error signal.

In blind landing operations, with the glide path receiver 55 included in the system, the signal from the radio receiver is a measure of the vertical displacement of the craft from path G. The signal of the pitch axis transmitter 50 measures the rate at which the displacement error signal from receiver 55 is decreasing.

In cross country flight, the signal from generator 44 measures the displacement of the craft from a predetermined altitude. The signal from transmitter 50 under such conditions measures the rate of change of the displacement signal effective to restore the craft to the desired altitude.

The effect of cross wind on the system can be evaluated as follows. If the wind is blowing across the path L, the heading of the craft will be in error. The angle between the heading selective indicator 20 and the pointer 20' of the directional gyro of the compass 16 is the drift angle. By moving the knob 20 to make the same correspond with or match the compass pointer, the cross wind will be set into the system and drift is compensated for immediately.

The system operates in a manner similar to that described in Fig. 3 when used in navigating a craft on a directional radio path. In this instance, however, switch 34 is closed to its right position as shown in Fig. 1 and switch 41 is closed to its left position to cut out the glide path receiver 55 and include the altitude control device 42 in the system.

It will be understood that the term "course" as employed in the present specification and claims is used in its broad sense to include, unless otherwise specified, either or both a heading such as that determined by a compass, gyroscope and the like and a ground track such as may be defined by radio means or some such reference medium which is predetermined or fixed relative to the ground. Furthermore, the term "flight path," unless otherwise specified, is used in its broad sense to include a navigational reference determined by, for example, a compass, an altimeter and like instrument as well as navigational references defined by radio means such as radio beacons, radio-defined localizer beams and glide path beams.

Since many changes could be made in the above construction and many apparently widely different embodiments of this invention could be made without departure from the scope thereof, it is intended that all matter contained in the above description or shown in the accompanying drawings shall be interpreted as illustrative and not in a limiting sense.

This application contains certain features common with the applications of Winslow Palmer, for Radio Navigation Systems for Dirigible Craft, Serial No. 761,354, filed July 16, 1947, Gregor L. Lang, for Radio Navigation Device, Serial No. 27,732, filed May 18, 1948, Orland E. Esval Serial No. 726,605 for Blind Landing Indicator and Controller for Aircraft, filed February 5, 1947, and applicant's continuation-in-part application Serial No. 128,227, filed November 14, 1949, all assigned to the same assignee as this application and all of which are issuing concurrently.

What is claimed is:

1. In a flying aid system for manually piloted dirigible craft, the combination of; a meter having a face with a reference position, a pointer movable relative to the reference position, and means for moving said pointer; first signal means for providing an output in accordance with changes of the craft from a predetermined heading, second signal means for providing an output in accordance with the angle of the bank of the craft, and coordinating means for said first and second signal means operatively connected to said pointer moving means to indicate to the pilot the sense and amount of the attitude change of the craft required to restore the same to the predetermined heading.

2. In a blind landing system for manually piloted dirigible craft, the combination of; a meter having a face with a reference position, a vertical pointer movable to the right and left of the reference position, and means for moving said pointer; first signal means for providing an output in accordance with the lateral distance of the craft from a radio beam localizer path, second signal means for providing an output in accordance with changes of the craft from a predetermined heading, third signal means for providing an output in accordance with the angle of bank of the craft, and coordinating means for said first, second and third signal means operatively connected to said pointer moving means to indicate to the pilot the sense and amount of the attitude change of the craft required to bring the same to and maintain the same on the localizer path.

3. In a navigating system for manually piloted dirigible craft, the combination of; a meter having a face with a reference position, a vertical pointer movable to the right and left of the reference position, and means for moving said pointer; first signal means for providing an output in accordance with the lateral distance of the craft from a directional radio path, second signal means for providing an output in accordance with changes of the craft from a predetermined heading, third signal means for providing an output in accordance with the angle of bank of the craft, and coordinating means for said first, second and third signal means operatively connected to said pointer moving means to indicate to the pilot the sense and amount of the attitude change of the craft required to bring the same to and maintain the same on the directional radio path.

4. In a flying aid system for manually piloted dirigible craft, the combination of; a meter having a face with a reference position, a pointer movable relative to the reference position, and means for moving said pointer; first signal means for providing an output in accordance with the angle of pitch of the craft, an altimeter for measuring the altitude of the craft and including second signal means for providing an output in accordance with departure in the altitude of the craft from a reference altitude, and means for supplying said signals in controlling relation to said pointer-moving means, said meter thereby indicating to the pilot the sense and amount of attitude correction required to restore the craft to the reference altitude.

5. A navigating system for manually piloted aircraft including yaw responsive means for providing a signal upon departure of the craft from a predetermined heading, roll responsive means for providing a signal in accordance with the rate of change of heading of the craft, means for coordinating said signals, and means operated by said coordinating means for indicating to the pilot the sense and amount of the attitude change needed about the fore and aft axis of the craft to restore it to the predetermined heading.

6. A navigating system for manually piloted aircraft including a directional reference device, means operated by said reference device for providing a signal upon departure of the craft from a predetermined heading, a vertical reference device, means operated by said vertical reference device for providing a signal in accordance with the angle of bank of the craft, means for coordinating said signals, and means operated by said coordinating means for indicating to the pilot the sense and amount of the correction in bank needed to restore the craft to its predetermined heading.

7. A navigating system for manually piloted aircraft including, a directional reference device having means for changing heading, means operated by said reference device for providing a signal until a desired new heading is reached, a vertical reference device, means operated by said vertical reference device for providing a signal in accordance with the angle of bank of the craft, means for coordinating said signals, and means operated by said coordinating means for indicating to the pilot the sense and amount of the correction in bank needed to bring the craft to and maintain the craft on the desired new heading.

8. A navigating system for manually piloted aircraft including an altimeter for measuring the altitude of the craft and including a pick-off associated therewith for providing a signal upon departure of the craft from a predetermined altitude, means for providing a signal in accordance with the rate of change of the altitude of the craft, means for coordinating said signals, and means operated by said coordinating means for indicating to the pilot the sense and amount of the attitude change needed about the pitch axis of the craft to restore it to the predetermined altitude.

9. A navigating system for manually piloted aircraft including an altimeter for measuring the altitude of the craft and including pick-off means associated therewith for providing a signal upon departure of the craft from a predetermined altitude, a vertical reference device, means operated by said vertical reference device for providing a signal in accordance with the angle of pitch of the craft, means for coordinating said signals, and means operated by said coordinating means for indicating to the pilot the sense and amount of the attitude change needed about the pitch axis of the craft to restore it to the predetermined altitude.

10. A navigating system for manually piloted aircraft including means for providing a signal in accordance with the lateral distance of the craft from a directional radio path, means for providing a signal in accordance with the rate of approach of the craft toward the radio defined path, means for providing a signal in accordance with the angle of bank of the craft, means for coordinating said signals, and means operated by said coordinating means for indicating to the pilot the sense and amount of the attitude change needed about the fore and aft axis of the craft to bring the craft to and maintain the craft on the directional radio path.

11. A system as claimed in claim 10, in which said means for providing a signal in accordance with the rate of approach of the craft includes a directional reference device and signal means operated by said device for providing a signal in accordance with the departure of the craft from a predetermined heading.

12. A system as claimed in claim 10, in which said means for providing a signal in accordance with the angle of bank of the craft about its vertical axis includes a vertical reference device and signal means operated by said device for providing a signal in accordance with the angle of bank of the craft.

13. A navigating system comprising means for supplying a signal proportional to the lateral displacement of a craft from a directional radio path, means for supplying a signal in accordance with the rate of approach of the craft toward the radio defined path, means for providing a signal proportional to the angle of bank of the craft, and means connected to receive said signals for supplying an output proportional to the algebraic sum thereof.

14. A system as claimed in claim 13, in which said means for providing a signal in accordance with the rate of approach of the craft includes a directional reference device and signal means operated by said device for providing a signal in accordance with the departure of the craft from a predetermined heading.

15. A system as claimed in claim 13, in which said means for providing a signal in accordance with the angle of bank of the craft includes a vertical reference device and signal means operated by said device for providing a signal in accordance with the angle of bank of the craft.

16. A steering aid system for manually piloted dirigible craft including means for providing a signal in accordance with the displacement of the craft from a predetermined direction of motion, means for providing a signal in accordance with the first derivative of the displacement, means for providing a signal proportional to the bank angle of the craft, means for coordinating said signals, and means operated by said coordinated means for indicating to the pilot the sense and amount of steering control needed to restore the craft to its predetermined direction of motion.

17. A visual flight indicating instrument for aircraft having an indicator normally centralized on an index, yaw responsive means tending to displace said indicator to the right or left thereof upon turn of the craft to the right or left from its course proportionally to the amount of turn, and roll responsive means also tending to displace said indicator to the right or left upon bank of the craft in a direction to cause turn of the craft to the left or right proportionally to the bank angle, the resultant displacement of said indicator being the difference of said two means.

18. A flight instrument as claimed in claim 17, in which said two displacing means are so interrelated that said indicator is centralized both when said craft is unbanked and on course and also when said craft is off course, but banked in a direction and amount to return the craft to course asymptotically.

19. A visual flight indicating instrument for aircraft having an indicator normally centralized on an index, an altimeter for measuring departures of the craft from a selected altitude and including a settable signal generating pick-off means for displacing said indicator up or down upon departure of the flight path above or below a preset altitude an amount proportional to such departure, and other means for also displacing said indicator up or down upon pitch of the craft down or up proportional to the pitch angle, the resultant displacement of said indicator being the difference of said two means.

20. A flight instrument as claimed in claim 19, in which said two displacing means are so interrelated that said indicator is centralized both when said craft is flying level at the preset altitude and when said craft is above or below said altitude but pitched at the proper angle to return it to said altitude asymptotically.

21. A visual flight indicating instrument for aircraft having a normally centralized indicator, means tending to displace said indicator to the right or left upon displacement of the craft to the right or left from its radio course proportionally to the amount of displacement, means tending to displace said indicator to the right or left upon a change in compass heading of the craft proportionally to such change, and a third means for also displacing said indicator to the right or left upon bank of the craft in a direction to cause turn of the craft to the left or right proportionally to the bank angle, the resultant displacement of said indicator being a combination of all three means.

22. A navigating system for manually piloted aircraft including a cross-pointer meter having a face with a reference position, a vertical pointer movable to the right and left of the reference position, means for moving the vertical pointer, a horizontal pointer movable above and below the reference position, and means for moving the horizontal pointer; first signal means for providing an output in accordance with departure of the craft from a predetermined heading, second signal means for providing an output in accordance with the angle of bank of the craft, coordinating means for said first and second signal means operatively connected to said vertical pointer moving means, third signal means for providing an output in accordance with departure of the craft from a reference altitude, fourth signal means for providing an output in accordance with the pitch angle of the craft, and coordinating means for said third and fourth signal means operatively connected to said horizontal pointer means.

23. A navigating system for manually piloted aircraft including a cross-pointer meter having a face with a reference position, a vertical pointer movable to the right and left of the reference position, means for moving the vertical pointer, a horizontal pointer movable above and below the reference position, and means for moving the horizontal pointer, first signal means for providing an output in accordance with the lateral displacement of the craft from a radio localizer beam path, second signal means for providing an output in accordance with the departure of the craft from a predetermined heading, third signal means for providing an output in accordance with the bank angle of the craft, coordinating means for said first, second and third signal means operatively connected to said vertical pointer moving means; fourth signal means for providing an output in accordance with the vertical displacement of the craft from a radio glide path beam, fifth signal means for providing an output in accordance with the angle of pitch of the craft, and coordinating means for said fourth and fifth signal means operatively connected to said horizontal pointer moving means.

24. A navigating system for manually piloted aircraft including a cross-pointer meter having a face with a reference position, a vertical pointer movable to the right and left of the reference position, means for moving the vertical pointer, a horizontal pointer movable above and below the reference position, and means for moving the horizontal pointer; first signal means for providing an output in accordance with the lateral displacement of the craft from a directional radio path, second signal means for providing an output in accordance with the departure of the craft from a predetermined heading, third signal means for providing an output in accordance with the angle of bank of the craft, coordinating means for said first, second and third signal means operatively connected to said vertical pointer moving means; fourth signal means for providing a signal in accordance with departure of the craft from a reference altitude, fifth signal means for providing an output in accordance with the angle of pitch of the craft, and coordinating means for said fourth and fifth signal means operatively connected to said horizontal pointer moving means.

25. In a navigating system, means for providing a signal in accordance with the lateral displacement of a craft from a directional radio path, a directional reference device including a heading indicator, a data transmission system including a signal transmitter controlled by said directional reference device and a two-part signal transformer, one part thereof being rotatble relative to the other, a heading selective indicator and means for jointly setting said heading selective indicator and said one part of said signal transformer, the signal output of said data system being dependent upon the angular disagreement between the heading of the craft and the heading set in at said heading selective indicator, means for supplying a signal proportional to the bank angle of the craft, and means connected to receive said signals for supplying an output proportional to the algebraic sum thereof.

26. In a navigation system by means of which a craft may be controlled to approach and thereafter maintain a chosen course, means for obtaining a signal proportional to the error between the present craft course and the chosen course, means for obtaining a signal corresponding to the angle of bank of the craft, and means connected to receive said signals for supplying an output proportional to the algebraic sum thereof.

27. In a navigation system by means of which a craft may be controlled to approach and thereafter maintain a chosen course, means for obtaining a signal proportional to craft displacement from a radio defined path, means for obtaining a signal corresponding to the angle of bank of the craft, and means connected to receive said signals for supplying an output proportional to the algebraic sum thereof.

28. In a navigation system by means of which a craft may be controlled to approach and thereafter maintain a chosen course, means for obtaining a signal proportional to craft displacement from a radio defined path, means for obtaining a signal corresponding to the rate of approach of the craft toward said path, means for obtaining a signal proportional to the bank angle of the craft, and means connected to receive said signals for supplying an output proportional to the algebraic sum thereof.

29. In a navigation system by means of which a craft may be controlled to approach and thereafter maintain a chosen course, means for obtaining a signal proportional to craft displacement from a radio defined path, a directional reference device including pick-off means for supplying a signal proportional to the angle between the direction of flight of the aircraft and the bearing of said radio defined path, means for providing a signal proportional to the angle of bank of the craft, and means connected to receive said signals for supplying an output proportional to the algebraic sum thereof.

30. In a navigation system by means of which a craft may be controlled to approach and thereafter maintain a chosen course, means for obtaining a signal proportional to craft displacement from a radio defined path, a directional reference device including pick-off means for providing a signal proportional to the angle between the direction of flight of the aircraft and the bearing of said radio defined path, a vertical reference device including pick-off means for supplying a signal proportional to the bank angle of the craft, and means connected to receive said signals for supplying an output proportional to the algebraic sum thereof.

31. In a navigating system by means of which a craft may be controlled to approach and thereafter maintain a chosen flight path, an altimeter for measuring the altitude of the craft and including a pick-off for supplying a signal proportional to displacement of the craft from a reference altitude, means for providing a signal proportional to the pitch angle of the craft, and means connected to receive said signals for supplying an output proportional to the algebraic sum thereof.

32. In a navigating system by means of which a craft may be controlled to approach and thereafter maintain a chosen flight path, an altimeter for measuring the altitude of the craft and including a pick-off for supplying a signal proportional to displacement of the craft from a reference altitude, means for providing a signal corresponding to the rate of change of the altitude of the craft, and means connected to receive said signals for supplying an output proportional to the algebraic sum thereof.

33. In a navigating system by means of which a craft may be controlled to approach and thereafter maintain a chosen flight path, an altimeter for measuring the altitude of the craft and including a pick-off for supplying a signal proportional to displacement of the craft from a reference altitude, a vertical reference device including a pick-off means for providing a signal proportional to the pitch angle of the craft, and means connected to receive said signals for supplying an output proportional to the alegbraic sum thereof.

34. In a navigating system by means of which aircraft may be controlled to follow chosen flight paths, a gyroscope for producing a horizontal reference signal, an altimeter for producing a signal upon departure from a predetermined altitude, an indicator normally controlled by a combination of said signals showing when a change in attitude is needed to maintain the chosen path, a normally idle radio glide path receiver for producing a signal, when operative, upon departure of the craft from a selected radio glide path, and means for transferring the control of said indicator, when approaching a landing, from the combined altimeter and gyroscope signals to a combination of said glide path receiver and gyroscope signals.

SPENCER KELLOGG, 2ND.

REFERENCES CITED

The following references are of record in the file of this patent:

UNITED STATES PATENTS

| Number | Name | Date |
|---|---|---|
| 1,306,552 | Minorsky | June 10, 1919 |
| 1,703,280 | Minorsky | Dec. 26, 1929 |
| 2,183,634 | Zworykin | Dec. 19, 1939 |
| 2,226,930 | Hefele | Dec. 31, 1940 |
| 2,259,600 | Alkan | Oct. 21, 1941 |
| 2,262,033 | Moseley | Nov. 11, 1941 |
| 2,262,245 | Moseley et al. | Nov. 11, 1941 |
| 2,372,185 | Wittkuhns | Mar. 27, 1945 |
| 2,390,383 | Neufeld | Dec. 4, 1945 |
| 2,395,854 | Ferrill | Mar. 5, 1946 |
| 2,400,232 | Hall | May 14, 1946 |
| 2,405,231 | Newhouse | Aug. 6, 1946 |
| 2,439,044 | Ferrill | Apr. 6, 1948 |
| 2,451,793 | Alexanderson et al. | Oct. 19, 1948 |
| 2,502,721 | Halpert | Apr. 4, 1950 |
| 2,536,683 | Germaix | Jan. 2, 1951 |

FOREIGN PATENTS

| Number | Country | Date |
|---|---|---|
| 260,260 | Great Britain | Jan. 12, 1928 |
| 516,567 | Great Britain | Jan. 5, 1940 |
| 607,601 | Great Britain | Sept. 2, 1948 |
| 888,812 | France | Sept. 13, 1943 |

Disclaimer 2,613,350.—*Spencer Kellogg, 2nd*, Glen Head, N. Y. FLIGHT INDICATING SYSTEM FOR DIRIGIBLE CRAFT. Patent dated Oct. 7, 1952. Disclaimer filed Feb. 28, 1957, by the inventor; the assignee, *Sperry Rand Corporation*, consenting.

Hereby enters this disclaimer to claim 27 of said patent.

[*Official Gazette April 2, 1957.*]